(12) United States Patent
Shah

(10) Patent No.: US 10,013,336 B2
(45) Date of Patent: Jul. 3, 2018

(54) INFORMATION TECHNOLOGY TESTING AND TESTING DATA MANAGEMENT

(71) Applicant: Accenture Global Services Limited, Dublin (IE)

(72) Inventor: Yashpal Shah, Mumbai (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 322 days.

(21) Appl. No.: 14/807,638

(22) Filed: Jul. 23, 2015

(65) Prior Publication Data

US 2016/0034379 A1  Feb. 4, 2016

(51) Int. Cl.
*G06F 17/30* (2006.01)
*G06F 11/36* (2006.01)

(52) U.S. Cl.
CPC ...... *G06F 11/3664* (2013.01); *G06F 11/3684* (2013.01); *G06F 17/30563* (2013.01); *G06F 17/30592* (2013.01)

(58) Field of Classification Search
CPC ............. G06F 17/3664; G06F 17/3684; G06F 17/30592; G06F 17/30563

USPC ........................................................ 707/692
See application file for complete search history.

(56) References Cited

U.S. PATENT DOCUMENTS

| | | | |
|---|---|---|---|
| 6,138,112 A * | 10/2000 | Slutz | G06F 11/3672 707/748 |
| 7,113,883 B1 * | 9/2006 | House et al. | 702/122 |
| 2005/0246390 A1 | 11/2005 | House et al. | |
| 2007/0179732 A1 | 8/2007 | Kolman et al. | |
| 2013/0262399 A1 | 10/2013 | Eker et al. | |

OTHER PUBLICATIONS

Emmi et al., Dynamic Test Input Generation for Database Applications, 2007, ACM, 151-161. (Year: 2007).*

* cited by examiner

*Primary Examiner* — Jean B Fleurantin
(74) *Attorney, Agent, or Firm* — Mannava & Kang, P.C.

(57) ABSTRACT

A testing and extract, transform and load (TETL) system is operable to interface with test platforms testing hardware or software components of information technology systems. The TETL system can execute extract, transform and load operations to load test data into a data warehouse and facilitates evaluating the test data across projects, entities and domains.

18 Claims, 13 Drawing Sheets

| Measure Group: | | Dimension | Hierarchy | Operator | Filter Expression |
|---|---|---|---|---|---|
| <All> v | | <Select dimension> v | | | |

Accenture Test Reporting
+ Measures
+ Dates
+ Defect Status
+ Test Execution Statutses
+ QC Audit
+ Release Management
+ Release Cycle Management
+ Requirements
+ Test Executions
− Test Lab
  ❖ Current User Defined Status
  ❖ Executed By
  ❖ Execution Date
  ❖ Execution Status
  ❖ Product
  ❖ Qc Cycle Id
  ❖ Qc Test Lab Id
  ❖ Qc Test Plan Id
  ❖ Release Id
  ❖ Req Id
  ❖ Req Ref
  ❖ Requirement Name
  ❖ Row History
  ❖ Test Lab Id
  ❖ Test Name
  ❖ Test Plan Id
  ❖ Test Set Id
  ❖ Tests Out Of Scope Wastage
  ❖ Testset Folder Id
  ❖ Track
+ Test Plan
+ Test Set − Cycle
+ Test Set Folder Tree
+ Time
+ Testers

| | | Line of Business | | | | | | | | |
|---|---|---|---|---|---|---|---|---|---|---|
| | | All | | | | | | | | |
| | | | Execution Status | | | | | | | |
| | | | Failed | | N/A | | No Run | | Not Completed | | Passed | | Grand Total |
| Release Name v | Product v | Test Lab Test Counts | | Test Lab Test Counts | | Test Lab Test Counts | | Test Lab Test Counts | | Test Lab Test Counts | | Test Lab Test Counts |
| ▫ PI134 | Band L2C | 21 | | 19 | | 116 | | 24 | | 456 | | 636 |
| | Band T2R | | | | | 16 | | | | 34 | | 50 |
| | BP Offline | 60 | | 3 | | 116 | | 10 | | 346 | | 535 |
| | Consumer Online | 8 | | 107 | | 1 | | | | 300 | | 416 |
| | Consumer Products Apps & Devices | 1 | | | | 1 | | | | 53 | | 55 |
| | Consumer Products Wifi | 2 | | | | 11 | | | | 98 | | 111 |
| | Eye L2C | 41 | | 36 | | 318 | | 36 | | 770 | | 1201 |
| | GXC Other Retail | 12 | | 36 | | 35 | | | | 265 | | 348 |
| | Invoice Assurance | 1 | | | | | | | | 38 | | 39 |
| | Mobility L2C | 1 | | 105 | | 4 | | | | 358 | | 468 |
| | Online | 95 | | 18 | | 807 | | 35 | | 1553 | | 2508 |
| | Online Band L2C | 40 | | | | 130 | | 15 | | 127 | | 312 |
| | Online Eye L2C | 19 | | | | 104 | | 44 | | 267 | | 434 |
| | Online Prod3 L2C | 1 | | | | 4 | | 1 | | 15 | | 21 |
| | Online Strategic Bundling | 5 | | | | 9 | | 2 | | 5 | | 21 |
| | Others | | | | | | | | | 92 | | 92 |
| | Prod1 | 10 | | 5 | | 41 | | 15 | | 112 | | 183 |
| | Prod2 | 90 | | 19 | | 203 | | 52 | | 588 | | 952 |
| | Prod3 L2C | 30 | | 12 | | 54 | | 8 | | 323 | | 427 |
| | Steel ThrCAD | | | | | | | | | 68 | | 68 |
| | Strategic Bundling | 37 | | 6 | | 87 | | 9 | | 239 | | 378 |
| | T2R | 11 | | 28 | | 30 | | 9 | | 461 | | 539 |
| | Total | 485 | | 394 | | 2087 | | 260 | | 6568 | | 9794 |

*FIG. 7*

INFORMATION TECHNOLOGY TESTING AND TESTING DATA MANAGEMENT

PRIORITY

The present application claims foreign priority under 35 U.S.C. § 119 to Indian Patent Application Serial Number 3770/CHE/2014, filed Aug. 1, 2014, which is incorporated by reference in its entirety.

BACKGROUND

Most information technology (IT) organizations have invested in one or multiple test management tools for managing testing efforts and associated resources for related IT solution implementations. Test management includes activities associated with the testing of a Solution Under Test (SUT). The SUT may include software, middleware, hardware and other types of IT system components. The tests may include functional and non-functional testing, such as requirements testing, performance testing, or defect resolution management prior to releasing a newly developed SUT or enhanced versions of a SUT into a production environment. The tests may also be done in a production environment, such as regression testing system upgrade validations.

A test management tool may assist a Quality Assurance Manager (QAM) with evaluating the quality of the SUT before releasing it into a production environment. However, given the multiple projects that are underway in any given IT environment, given the diversity of IT solutions and underlying systems, and given the variety of correlated objectives for implementing such solutions including IT management constraints, it is often difficult to provide the QAM with an analysis of required and current management information based on a macro view across domains and across multiple projects having various SUTs. IT organizations may have to rely on data that, at given points in time, may be accurate in regard to individual SUTs, i.e., at a micro level, but is incomplete or misleading when the same domains and entities are viewed for multiple SUTs at the macro level. Most testing tools available in the market today lack the ability to provide multi-level reporting spanning across a plurality of projects or domains or releases and mainly focus on testing functionalities. Any reporting that may be provided through available test management tools is typically folder-based and also cannot support few non-compliance reports. Additionally, conventional reporting may be unable to provide in-depth analysis on data like key performance indicators (KPIs) and business-driven metrics in just a button-click or none at all, which otherwise usually requires data extraction using a spreadsheet macro before generating such data.

BRIEF DESCRIPTION OF DRAWINGS

The embodiments are described in detail in the following description with reference to the following figures. The figures illustrate examples of the embodiments.

FIG. 7 illustrates an example of a user interface, according to an embodiment;

DETAILED DESCRIPTION OF EMBODIMENTS

Figure 1:
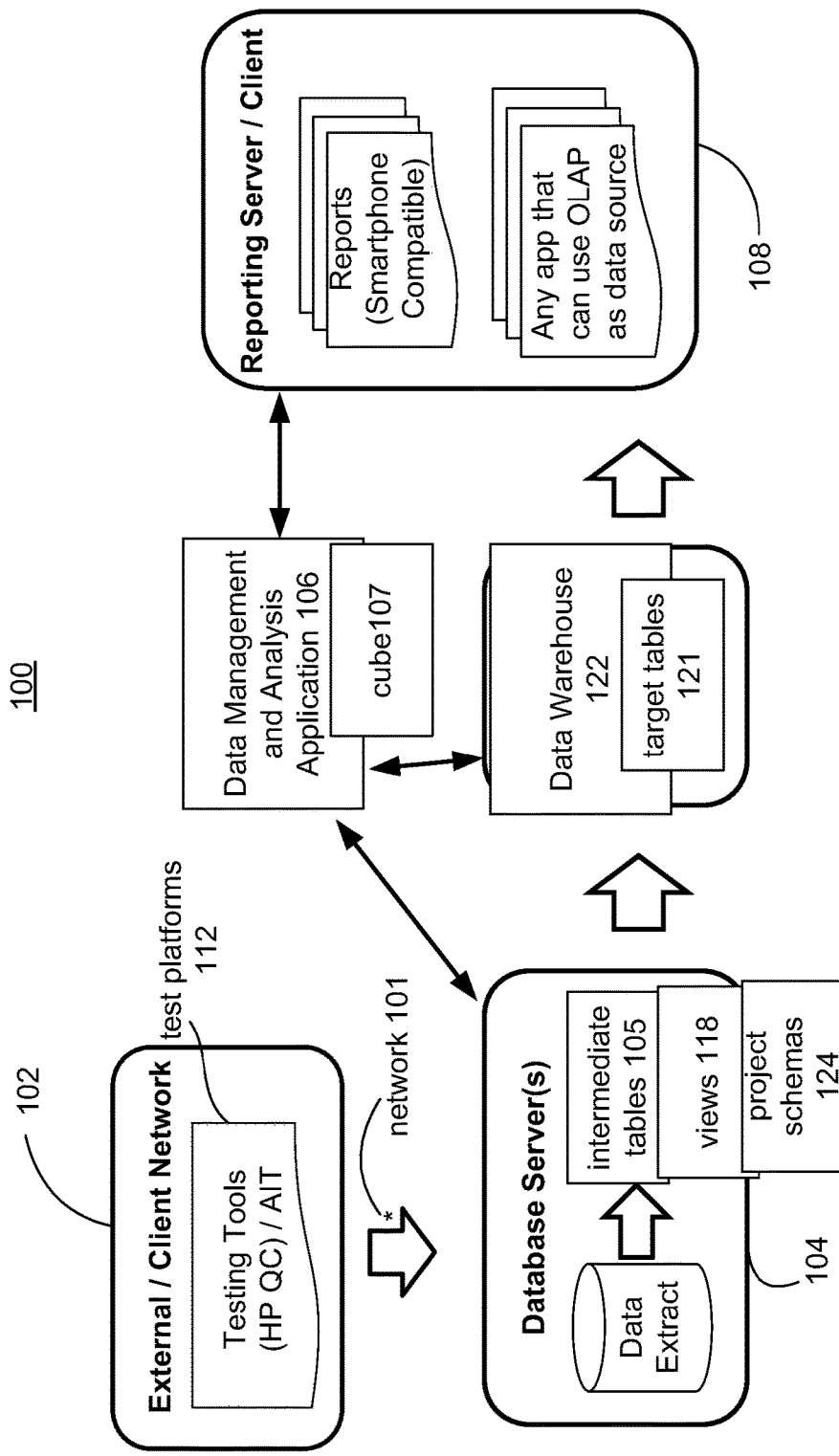
FIG. 1 illustrates data flow for a Testing and ETL (Extract, Transform, and Load) system, according to an embodiment.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Furthermore, the embodiments may be used together in various combinations.

According to an embodiment, a Testing and ETL (Extract, Transform, and Load) system, referred to as TETL, is operable to extract test data from multiple test platforms that are testing SUTs for various projects and various domains. Different tests and/or test platforms may be used for different projects to test different SUTs. In one example, an SUT is a software application. The test platform may include a set of software modules designed for testing and delivery of the application for a production environment. Another example of an SUT may be a storage system, such as a storage area network (SAN). The test platform may simulate the SAN's performance by setting many of the parameters and running tests, and performing repeated test runs with different parameters, such as different block sizes, to tune the SAN for a particular environment. The SUT for example, may include any IT component, such as servers, routers, applications, etc. Each test platform may measure multiple metrics and one or more of the metrics may be different for each platform. The metrics may include pass/fail metrics, bug metrics, or any type of measurements measured by the test platforms. One or more test platforms may be used to test an SUT for a project. The SUT may include hardware, software or a combination thereof and the test platform may include hardware, software or a combination thereof. A project may include a group of tasks, including testing, that is related and may be designed to achieve a particular goal. A domain may include multiple projects related by an attribute. For example, multiple projects may be for the same IT department or for the same systems or for different test phases. Entities may include a person or group or organization associated with a project or multiple projects. An entity may also include a product. The TETL may be able to report test data across domains, entities and projects.

The TETL is operable to perform extract, transform and load (ETL) operations for populating tables of one or more databases which may be in a data warehouse or flat files. ETL operations can facilitate the loading of the data from many different data sources (e.g., test platforms) into a database, including transforming the data prior to the loading. The data warehouse may be connected to a data management and analysis application that can provide data reporting and other data analysis functionality. Examples of the data management and analysis application may include an online analytical processing (OLAP) system, a hybrid online analytical processing (HOLAP) system, a Relational OLAP (ROLAP) and Multidimensional OLAP (MOLAP). The data management and analysis application may be part of the TETL.

The TETL can extract test data from each of a plurality of test platforms that test one or more SUTs. For example, the TETL extracts data for each test platform and may load the data into intermediate tables in a data staging area. In an example, the data may be loaded into a common database in the intermediate tables as a separate test data instance, and each test platform instance is represented by a schema developed for the particular test platform. Views common to each of the schemas are generated dynamically and may be used to load the test data from the test platforms into data warehouse tables, referred to as target tables.

The data management and analysis application may provide access to the test data from the multiple test platforms. The data management and analysis application may allow creating cubes and allows a user to specify different operations to retrieve a subset of a multi-dimensional array. The operations may include a slicing operation, a drill down operation, etc. allowing the user to view data in a desired manner. The data management and analysis application may compile metrics (e.g., different measurements measured by the test platforms) from the test platforms for a plurality of metrics and domains and for multiple quality control or test projects. The data management and analysis application can evaluate the metrics and generate trends based on the metrics to allow the user to make intelligent decisions in regards to the multiple projects. The data management and analysis application may be used for report generation in software such as Excel®, ReportBuilder®, SSRS (SQL Server Reporting Services) Reports®, etc.

A technical problem with conventional testing tools is the inability to view test data across projects and across domains and across entities. For example, an entity may employ multiple, different test platforms designed to test various different types of SUTs. The IT administrators may have to rely on data that, at given points in time, may be accurate in regard to individual SUTs, i.e., at a micro level, but is incomplete or misleading when test data for multiple SUTs in the same domain are viewed at the macro level. Many testing tools available in the market today lack the ability to provide multi-level reporting spanning across a plurality of projects or domains or releases and mainly focus on testing functionalities. Furthermore, each testing tool can measure different metrics so it is difficult to combine the output of different testing tools. Additionally, often, each testing tool stores data in a separate database for each project. In many instances, the databases are independent of one another and as a result it is difficult to provide reporting across projects and across domains that may encompass different sets of projects.

The TETL according to an embodiment, instead of creating a separate database for each project, performs novel ETL operations including determining a schema for each project. A master schema may be created that includes fields from each project schema, and generic views may be generated that are compatible across the project schemas. Also, customized views can be generated for specific types of reporting. Extracting project test data may be transformed and loaded into target tables in one or more databases for example in a data warehouse. The data in the target tables may be structured according to a master view determined from the project schemas and that facilitates reporting across projects and across domains. Furthermore, a data management and analysis application may be used to further slice and dice the data as needed for desired reporting.

Figure 2:
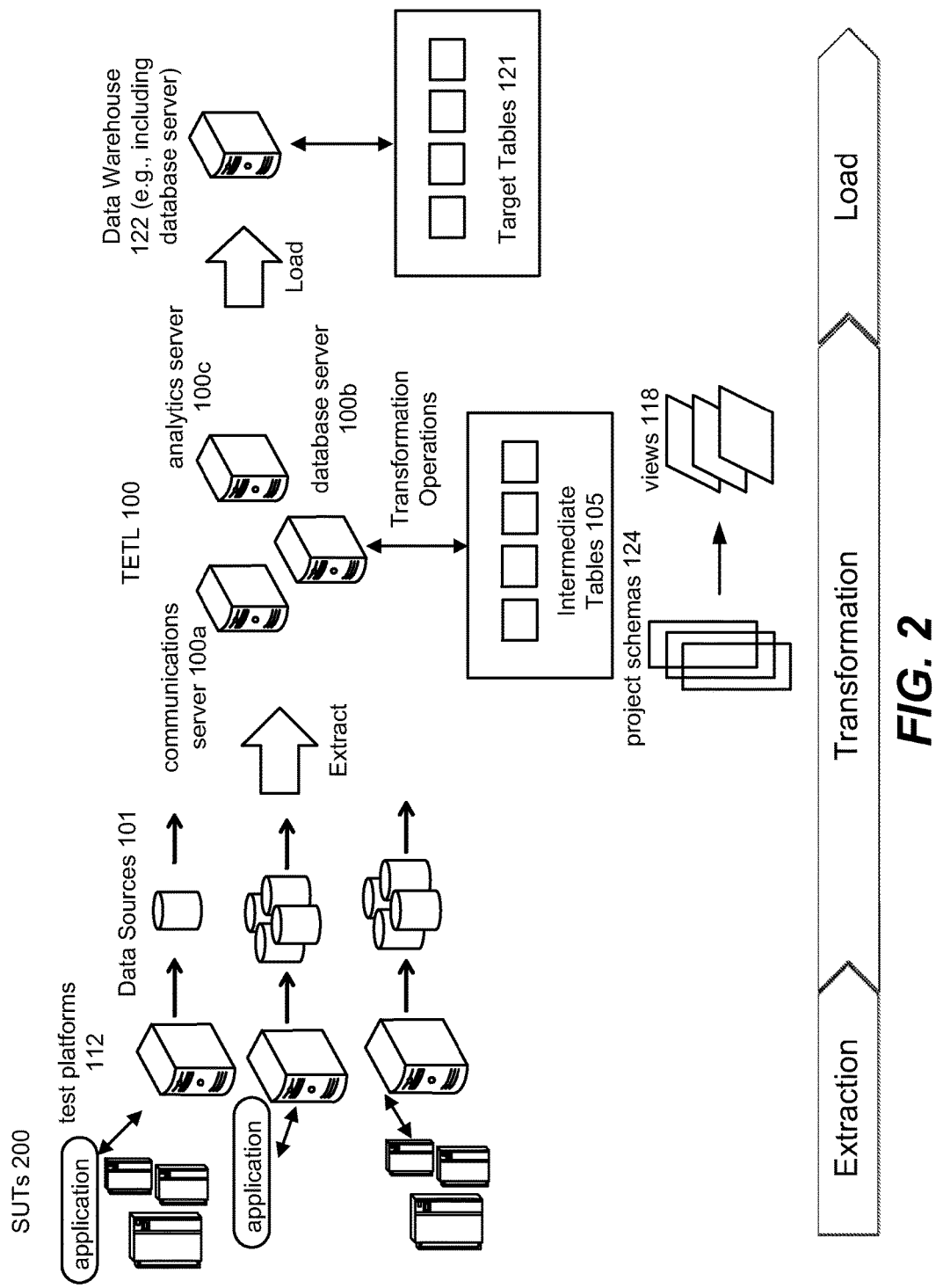
FIG. 2 illustrates Testing and ETL system, according to an embodiment.
Figure 3:
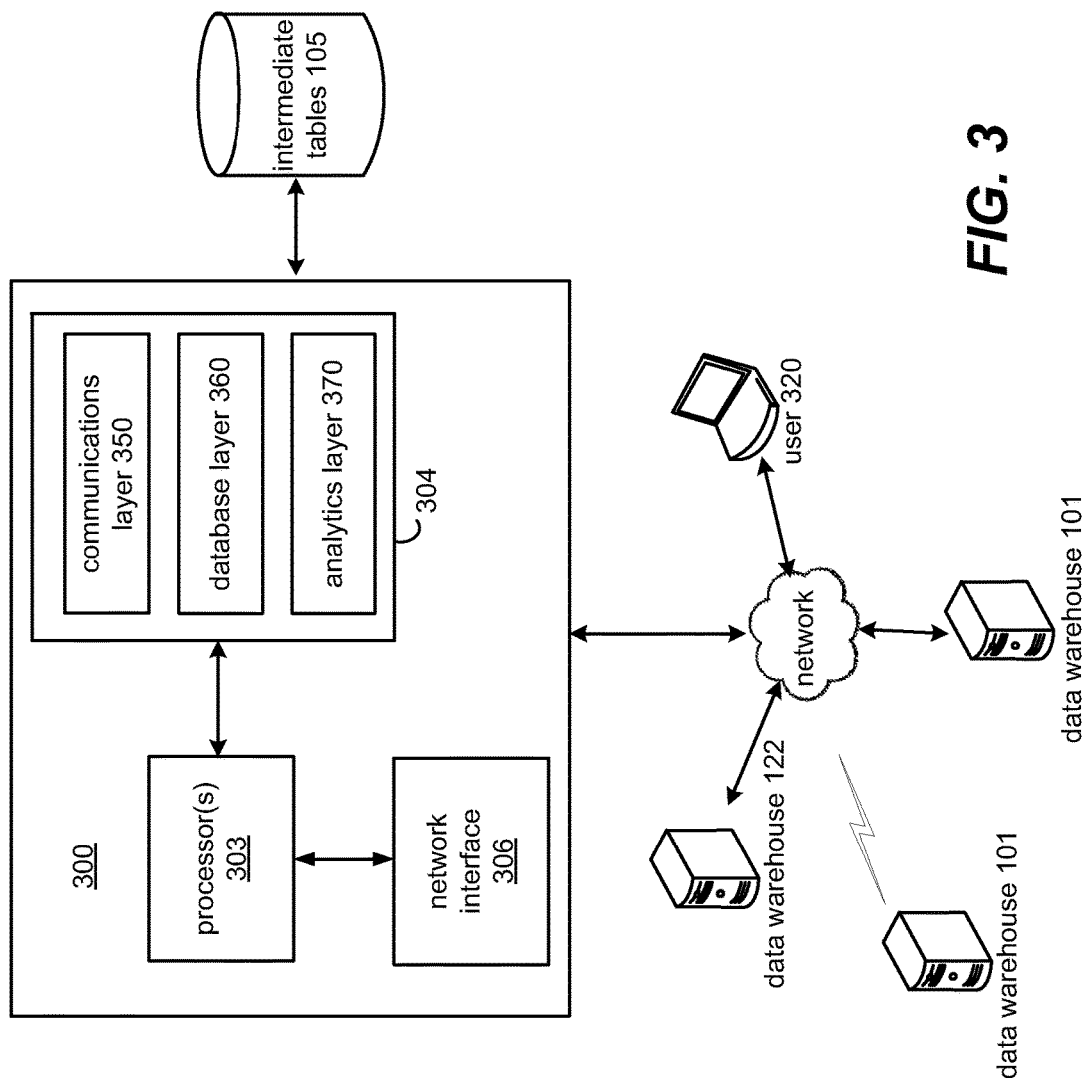
FIG. 3 illustrates a block diagram of computing platform include machine readable instructions for Testing and ETL system, according to an embodiment.

FIGS. 1-3 depict a test and extract, transform and load system 100 (hereinafter "TETL 100"), according to embodiments that reports or facilitates analysis on the execution status of multiple test projects across multiple domains and may generate testing results for requirements, defects, test cases, releases, etc. Each domain may have a number of entities, and these entities may be further distinguished, as discussed below.

In one embodiment, TETL 100 is in communication with test platforms, for example, in one or more client networks 102, over a network 101 that may include the Internet. Each test platform 112 generates one or more sets of test data, e.g., test data instances, for each project. The test data for different projects may have different metrics. The test data is transmitted to database server 104 over the network 101. The database server 104 may include a landing area, including intermediate tables 105, in which the test data instances from the test platforms 112 are extracted and loaded into intermediate tables 105 which may be part of a common database. The common database may include test data instances, project schemas 124, and views 118, which may include a common view and custom views and a master view. A view may include a virtual table computed or collated dynamically from data in the underlying physical tables of a database, such as the intermediate tables 105 of the common database. Changes applied to the data in a relevant underlying table are reflected in the data shown in subsequent invocations of the view. A common view includes fields that are common to multiple project schemas. A custom view includes fields that are not common to multiple project schemas. The project schemas 124 may include schemas for particular projects or particular SUT tests. The project schemas 124 may describe the relationship of the test data for a particular project in terms of the common database. The project schemas 124 each include fields for test data for the project. Test data instances associated with each SUT that is tested are loaded into an intermediate table based upon the associated project schema using a data loader. The data loader may also load data from the intermediate tables 105 to target tables 121 of data warehouse 122. The intermediate tables 105 are created to facilitate and optimize the transformation and loading and processing of the test data instances.

Database server 104 may include a business process area (BPA) that includes procedures and software code to transform the data from the intermediate tables 105 to data to be loaded into the target tables 121 of data warehouse 122. Based on the common views and the custom views, the data from the LDA is transformed, and the transformed data is loaded, either incrementally or fully into the target tables 121. In one example, the data from the LDA is transformed into fact tables corresponding to metrics of tests performed by the test platforms 112 and dimension tables that include details about each instance of an object.

A data management and analysis application 106, such as an OLAP application, may specify a structure of a cube 107 (e.g., an OLAP cube) defined by metadata. The metadata may describe a schema of the cube, which may be an OLAP structure, including dimensions, hierarchies and categories that may incorporate elements of individual project schemas and the common and custom views. Dimensions may have different levels of categories in hierarchy. A category is a member of a dimension and may include an item matching a specific description or classification. Categories can be considered hierarchies in which the categories are organized in different levels having parents and children. A drill-down operation may be performed on the cube 107 to view data at different levels of the hierarchy. A drill-up operation may also be performed. A parent category may be the next higher level of another category in a drill-up operation. A child category may be the next lower level of another category in a drill-down operation.

Figure 8:
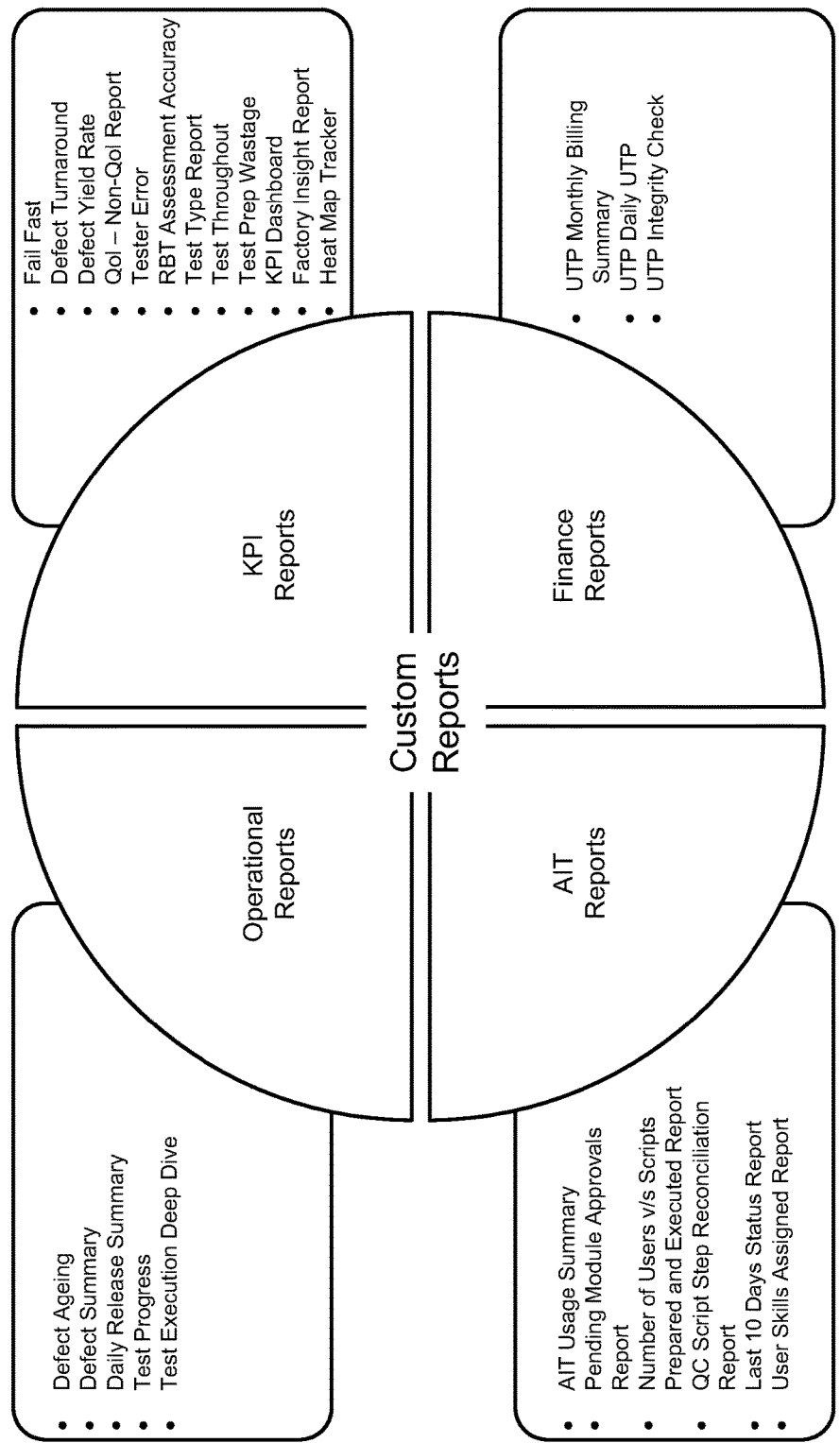
FIG. 8 illustrates examples of reports, according to an embodiment.

The data management and analysis application 106 is operable to make the cube 107 available as a data source for reporting server 108. In one embodiment, reporting server 108 includes a processor and program memory to execute reporting programs, including spreadsheet programs, including, EXCEL®, SQL Server Reporting Services (SSRS) and ReportBuilder® by MICROSOFT®. FIG. 8 depicts several classes of reports and particular reports, including operational reports, key performance indicator (KPI) reports, and finance reports.

FIG. 2 shows a more detailed diagram of the TETL 100. In an embodiment, the TETL 100 may include communications server 100a, database server 100b, and data management and analysis server 100c. Each server may include one or more processors, memory and other data storage to store software applications and data to perform its functions. The TETL 100 in other embodiments may include computer systems other than servers, or the TETL 100 may execute applications for the servers 100a-c on a single computer system or server or on multiple computer systems or servers.

The communications server 100a interfaces with the data sources 101 to extract data from the data sources 101. The communications server 100a may include one or more interfaces, such as a web server, application program interfaces, etc., that facilitate receiving data from the data sources 101. The communications server 100a may execute any suitable communication applications to extract data from the data sources 101. The data sources 101 for example include the test platforms 112 that test SUTs 200 and generate the test data instances which are transmitted to the TETL 100 via the communications server 100a. Project schemas may also be received from the test platforms 112. The SUTs 200 may include, by way of example, applications, computer systems, or other IT components.

The database server 100b stores the extracted test data in intermediate tables 105 and performs transformation operations on the extracted data to transform the data for storage in target tables 121. The database server 100b also loads the transformed data into the target tables 121, which may be in a data warehouse 122 or another data storage system. The data warehouse 122 may include a traditional database management system, a HADOOP distributed file system, or any suitable data storage and management system. The tables 105 are referred to as intermediate tables or staging tables because they are used for processing data from the data sources 101 before loading the data into the target tables 121 of the data warehouse 122.

Some of the transformation operations performed for example by the database server 100b and/or analytics server 100c on the extracted data may include deconstructing data structures, such as fact tables and dimension tables extracted from the data sources 101, in normalized form into a schema of a common database in the intermediate tables 105. Data cleansing and fuzzy matching operations may be performed on the data for storing the data in the intermediate tables 105. The transformation operations may include determining project schemas for SUTs tested by the test platforms, determining fields from each project schema common to all the project schemas 124 and not common to all the project schemas 124 to generate views 118, which include a common view, a master view and custom views.

The database server 100b loads data from the intermediate tables 105 for the master view into target tables 121 in data warehouse 122, wherein the target tables 121 include fields corresponding to the master view and may include fields identifying projects, domains and entities, and fields for measured test data determined by the test platforms 112. Once the transformed data is loaded into the target tables 121 in the data warehouse 122, the data in the target tables 121 may be used for real-time decision making processes performed by external systems and for report generation across projects and across domains. For example, the analytics server 100c may host the data management and analysis application 106 described above, which may be able to generate cubes, such as cube 107 shown in FIG. 1, to slice and dice data according to given dimensions.

FIG. 3 illustrates a computer platform 300 that may be used for one or more of the servers 100a-c for TETL 100. For example, the platform 300 may be a server or another computer and includes, for example, processor(s) 303, a data storage device 304, and a network interface 306. Also, the components are shown in a single computer as an example and in other examples the components may exist on multiple computers and the components may comprise multiple processors, data storage devices, interfaces, etc. For example, the components, such as layers 350-370, may be provided on respective servers 100a-c.

The data storage 304 may include a hard disk, memory, or any type of non-transitory computer readable medium. The data storage 304 may store any data used by the TETL 100. The processor 303 may be a microprocessor, a microcontroller, an application specific integrated circuit (ASIC), field programmable gate array (FPGA), or other type of circuit to perform various processing functions.

The data storage 304 may store machine readable instructions executed by the processor 303 to perform the operations of the TETL 100. The machine readable instructions may include a communications layer 350 comprised of communications applications for extracting data from the data sources 101. The communications applications may include a web server application, a portal application, etc. The data storage 304 may store other information, such as the project schemas 124 and views 118, source-to-target mappings, validation rules, primary key and foreign key relationships, configuration information or any information used by the TETL 100.

The database layer 360 performs the transformation operations described herein. Additionally, the database layer 360 may include SQL server or another type of database front-end to execute queries and perform other database management functions on data in the intermediate tables 105. Also, the database layer 360 performs load operations to load data from the intermediate tables 105 to the target tables 121. The analytics layer 370 include the data management and analysis application 106 or applications for reporting and for predicting values based on historic data sets generated, for example, by the database layer 360. Transformation operations described herein may be performed by the database layer 360 and/or the analytics layer 370.

The network interface 306 comprises a hardware and/or a software interface. The network interface 306 for example connects the system 100 to the Internet, a local area network, etc. Also, users, such as user 320, may connect to the computer platform 300 via the network interface 306. The user 320 may provide user input including information for view or schema generation, selections for dimensions and variable transforms, etc. Also, data may be provided to the user 320, such as reports, entity views, etc., via the network interface 306.

Figure 4A:
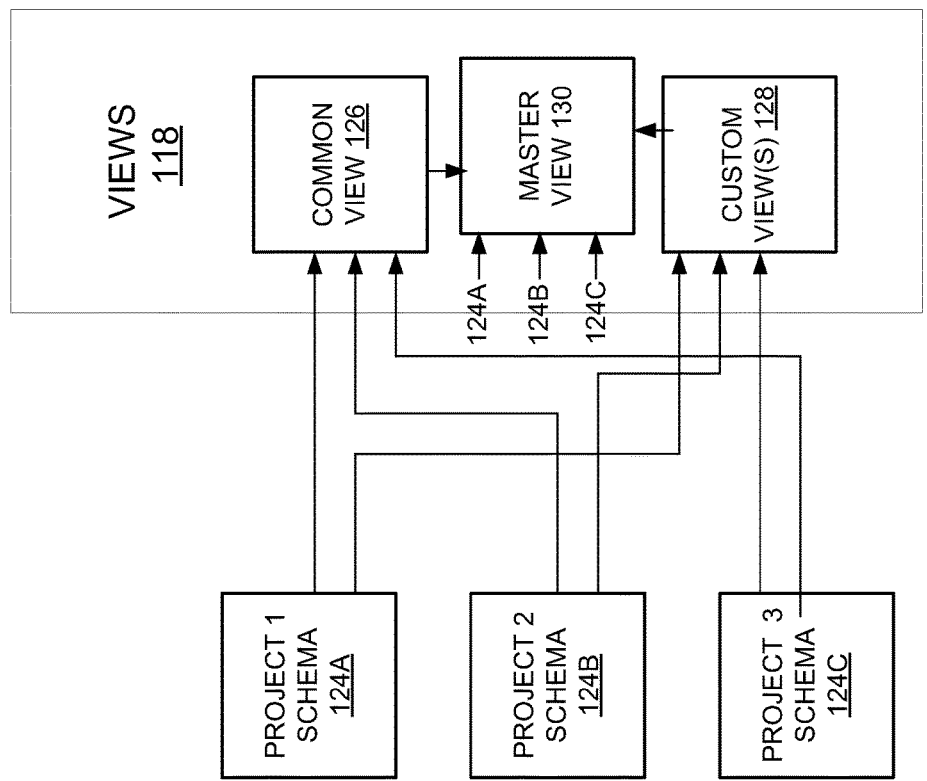
FIG. 4A illustrates views, according to an embodiment.

FIG. 4A depicts views 118 generated from fields from the project schemas 124. The views 118 for example include common view 126, custom view 128 and master view 130. For example, the common view 126 includes fields common to project schemas 124A-C of project 1-3, respectively. The custom view 128 includes fields from one or more of project schemas 124 or generated fields that are not common to all the project schemas 124A-C and that are not in the common view 126. For example, a schema 124A for project 1 may include a field that is not included in schema 124B or schema 124C for project 2 or project 3. In addition, custom view 128 allows for the creation of new fields based upon an operation involving one or more other fields, such as an aggregation, average, etc. Thus, custom view 128 allows for the storing and processing of data not presented in common view 126. The master view 130 may include all fields from the project schemas 124. The master view 130 may be generated from the common view 126, the custom view 128 and/or the project schemas 124. The master view 130 includes all the fields from all the project schemas 124.

Figure 4B:
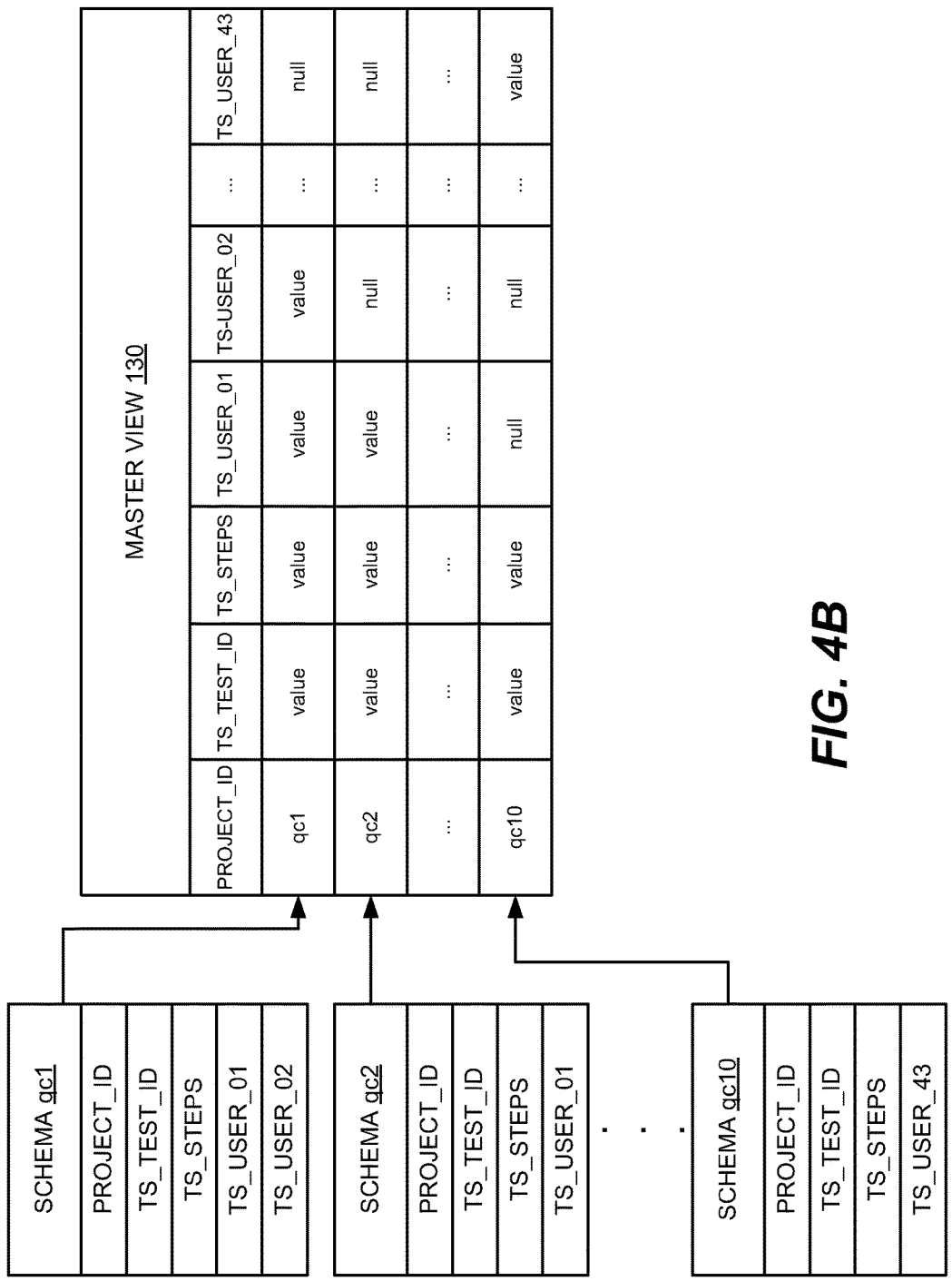
FIG. 4B illustrates a master view, according to an embodiment.

FIG. 4B illustrates an example of generating the master view 130 from fields in the project schemas 124. Table 1, shown below, shows examples of fields that may be in the project schemas 124. The fields are for projects qc1-10. The fields may be mostly the same across schemas but some schemas include fields not included in other schemas.

TABLE 1

| Schema | Table  | Column       |
|--------|--------|--------------|
| qc1    | TEST1  | PROJECT_ID   |
| qc1    | TEST1  | TS_TEST_ID   |
| qc1    | TEST1  | TS_NAME      |
| qc1    | TEST1  | TS_STEPS     |
| qc1    | TEST1  | TS_USER_01   |
| qc1    | TEST1  | TS_USER_02   |
| qc2    | TEST2  | PROJECT_ID   |
| qc2    | TEST2  | TS_TEST_ID   |
| qc2    | TEST2  | TS_NAME      |
| qc2    | TEST2  | TS_STEPS     |
| qc2    | TEST2  | TS_USER_01   |
| ...    | ...    | ...          |
| qc10   | TEST10 | PROJECT_ID   |
| qc10   | TEST10 | TS_TEST_ID   |
| qc10   | TEST10 | TS_NAME      |
| qc10   | TEST10 | TS_STEPS     |
| qc10   | TEST10 | TS_USER_43   |
| qc10   | TEST10 | TS_USER_44   |

As shown in FIG. 4B, the master view 130 is created including all fields from schemas qc1-qc10. The master view 130 may be created from the common view 128. For example, all the fields from the common view 128, e.g., fields PROJECT_ID, TS_TEST_ID, AND TS_STEPS of schemas qc1-qc10, and identifying fields TS_USER_01, TS_USER_02, are included in the master view 130. Also, all fields not common to all the schemas qc1-qc10, e.g., TS_USER_43, are included in the master view 130. The non-common fields may be determined The common and non-common fields may be appended to the master view 130 until the master view contains all the fields of all the schemas qc1-qc10. Because a schema for a particular project may not have a field present in the master view 130, e.g., no field TS_USER_43 in schema qc1, the missing field may be populated with a null value when a database is created and populated with data for that project. Custom views may be generated for a subset of the fields in the master view 130. As illustrated in FIG. 4B and further described below, the data represented by the views is subsequently loaded into a flat table or a database, including target tables 121, in the data warehouse 122 structured according to the master view 130 and may include data for all the schemas.

An example of a portion of a query to create the master view 130 from the fields of the schemas qc1-qc10 is as follows:

```
CREATE VIEW [dbo].[TEST]
AS
SELECT [PROJECT_ID] as 'PROJECT_ID',[TS_ATTACHMENT] as
'TS_ATTACHMENT',[TS_USER_01] as
'TS_AUTOMATION_STATUS',[TS_BASE_TEST_ID] as
'TS_BASE_TEST_ID',NULL as
'TS_BASELINE_DATE',[TS_BPTA_CHANGE_DETECTED] as
'TS_BPTA_CHANGE_DETECTED'...
GO
```

Figure 5:
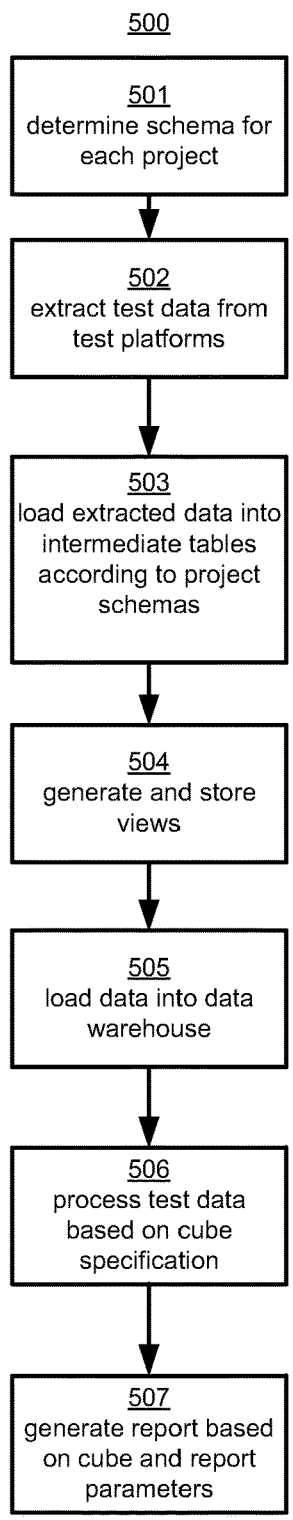
FIGS. 5 and 6 illustrate methods that may be performed by Testing and ETL system, according to an embodiment.

FIG. 5 shows an example of a method for performing ETL operations on test data instances, according to an embodiment. The method 500 and other methods and processes described herein are described by way of example as being performed by the TETL 100 shown in FIGS. 1-3, but may be performed by other systems. Also, one or more of the steps of the methods described below may be performed in the order shown or in other orders or substantially simultaneously.

At 501, a project schema is determined for each project. For example, multiple software development projects are on-going, and one or more of the test platforms 112 are used to test the software for the projects at various phases. A schema is created for each project based on the test data to be received from the testing tool for each particular project. The schema includes fields for the test data, and the fields may include fact table fields that include measured metrics determined by the test platform and may include dimension tables including information about the project, test phase, etc. The project schemas may be extracted from the test platforms 112 or input by a user at the TETL 100. The project schemas may be stored at the TETL 100.

At 502, test data for each test project is extracted from the test platforms 112. Test data may be received at a scheduled time, an interval, e.g. every hour, or may be received based upon a request from the TETL 100. The test data may include test data instances, which may be sets of test data. For example, a test data instance may include measurements performed at a particular time period or for a particular software phase or version. Defects and bugs may be detected from the testing, and potential fixes are implemented. The software is tested again and creates another test data instance to check if the defects are rectified.

At 503, the extracted test data from the test platforms 112 are loaded into the intermediate tables 105 according to respective project schemas 124. The TETL 100 may include data loaders comprised of software to extract the data from the test platforms 112 and load the data into intermediate tables that are configured with the fields for the respective project schema. A data loader may determine the project associated with received test data, identify a stored project schema for the test data, identify intermediate tables configured for the project schema, and store the test data in the identified intermediate tables. In an example, a project may be determined from information provided in or with the test data from the test platform. The TETL 100 may store a list of project schemas, and project information is matched based on a common identifier against the list of project schemas to identify a matching project schema for the test data. The project schemas may include table names that are configured in the intermediate tables 105. After a project schema is identified for test data, the test data is stored in the table or tables identified from the project schema for the test data.

At 504, views 118 are generated and stored. The views 118 may include a common view 126, custom view(s) 128 and master view 130, such as shown in FIGS. 4A-B. The TETL 100 may create the common view 126 by identifying all common fields from the project schemas 124, and creating the common view to include the common fields. The TETL 100 may create the master view 130 by identifying all the fields from the project schemas 124 and creating a view that includes all the fields. Custom view(s) may be generated based on user selected fields or rules and may include views with fields that are calculated from values in other fields.

At block 505, the test data from the intermediate tables 105 is loaded into target tables 121 in the data warehouse 122. The target tables 121 may be configured according to the master view 130, such as to include all the fields of the master view 130.

The custom and common views may be generated from the data in the intermediate tables 105 or from the data loaded into the target tables 121. In one example, the data may be loaded from the intermediate tables 111 into a master flat table having a structure consistent with the master view, and the custom and common views can be generated from the master flat table. In another example, the data is loaded into a master database in the data warehouse 122 configured according to the master view. Transformations operations may be performed prior to or during the load into the data warehouse 122. Example of transformations may include converting a schema ID into a project ID, storing an integer value in a field that demands an integer, and storing null values if a field is empty.

At 506, the test data in the master database (e.g., target tables 121) in the data warehouse 122 is processed based on a specification defined for a cube, such as cube 107 shown in FIG. 1. In one embodiment, the processing of the cube 107 is performed by data management and analysis application 106. In at least another embodiment, the cube 107 and the processing of the cube specification is performed by one or more database servers. Distinctions may be made between fact tables and dimensions when creating the cube 107 for reporting. Fact tables contain measurable quantities. Dimensions may be created that relate to attributes of projects, entities or domains and facts may be populated in the dimensions for reporting. At 507, reports are generated by the data management and analysis application 106 for example based on the cube specification and/or report parameters that may be specified by a user. As described above, the reporting may be at the macro level across domains, entities and projects or at micro levels.

Figure 6:
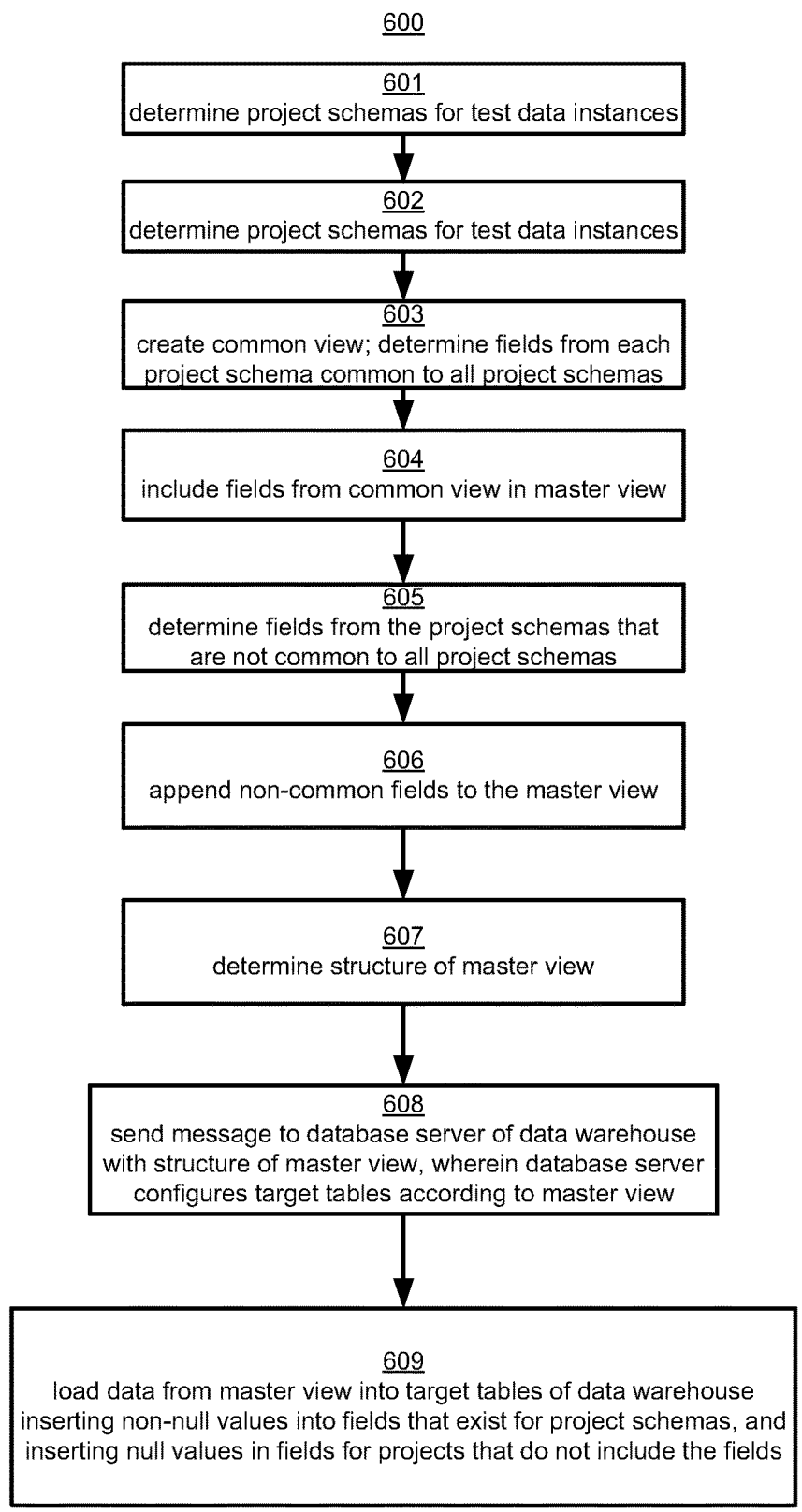

FIG. 6 shows a method 600 for creating a master view, such as master view 130 shown in FIG. 4B, from test data, according to an embodiment. At 601, project schemas 124 for SUTs, such as software, hardware, etc., tested by the test platforms 112 are determined. The project schemas may be received from the test platforms 112 or input by a user. At 602, all fields from the project schemas 124 are determined. For example, the field names and characteristics, such as fields size, data type, etc., may be determined for each of the fields. At 603, a common view is created that includes all fields common to all project schemas 124, e.g., fields for PROJECT_ID, TS_TEST_ID, AND TS_STEPS of schemas qc1-qc10 shown in FIG. 4B are identified. Fields may be determined to be common if they have the same or similar field names. For example, an exact match may indicate a matching field. Fields names that are not exactly the same may also be matched. For example, fields with similar names and similar field descriptions may be matched as common fields. Also, a list of field names may be compiled that are similar but are considered to be a match, and field names of the project schemas may be compared to the list to determine whether they are common. Also, a user may identify fields that are common or may verify whether fields are common. At 602, all identified common fields are appended to the master view 130.

At 604, include the fields in the common view in the master view 130. At 605, fields of the projects schemas 124 that are not common to all other project schemas, e.g., TS_USER_01, TS_USER_02, and TS_USER_43 shown in FIG. 4B are identified. For example, any fields remaining from the fields determined at 603 after removing the fields determined to be common to all projects are determined to be the non-common fields. At 606, all the identified non-common fields are appended to the master view 130.

At 607, the structure of the master view 130 is determined, including for example, fields, data types for fields, field size, etc. At 608, the structure of the master view is sent to the data ware house 122. For example, an XML file is created with the master view structure. The XML file is sent in a message to a database server of the data warehouse 122, and the database server configures the target tables 121 according to the master view. For example, the tables of the master view are created in the target tables 121. At 609, data from the master view 130 is loaded into the target tables 121. Non-null values are loaded into fields that exist for a particular project schema, and null values may be loaded into fields for projects that do not include the particular field.

FIG. 7 depicts an example of a user interface operable to allow a user to view reports based upon the hierarchical layout of the domains and entities and projects. The interface may be generated by the data management and analysis application 106 or the interface may be generated by a spreadsheet program that connected to the data management and analysis application 106 via an application program interface to generate reports.

The interface allows users to define the cube 107. For example, dimensions are selected for the cube 107. A user may also specify slicing clauses as needed to view domains and entities across multiple projects. A user-initiated process of navigating an OLAP cube by requesting page displays interactively through the specification of slices via rotations and drill-down/drill-up operations is sometimes called "slice and dice".

The data shown in FIG. 7 for example is test data generated by one or more of the test platforms 112. Examples of domains are shown for software testing, such as dates, defects, defect status, test execution status, etc. The data management and analysis application 106 can report on test data across projects and entities in any of these domains. For example, a domain of "Test Lab" is selected. A metric of "Test Lab Tests Counts" is aggregated across projects for entity (e.g., each product). Test data for this metric is aggregated for all projects in for each entity and is shown. Various dimensions and lines of business may also be selected through this interface.

The data management and analysis application 106 may generate multiple types of reports based on the cube 107. As shown in FIG. 8, examples of the report types may include operational reports, KPI reports, finance reports and Administrator-In-Training (AIT) reports. Operational reports may include Defect Ageing, Defect Summary, Daily Release Summary, Test Progress, and Test Execution Deep Dive. KPI reports may include Fail Fast, Defect Turnaround, Defect Yield Rate, Qol-Non-Qol Report, Tester Error, RBT Assessment Accuracy, Test Type Report, Test Throughput, Test Prep Wastage, KPI Dashboard, Factory Insight Report, and Heat Map Tracker. AIT Reports may include AIT Usage Summary, Pending Module Approvals Report, Number of Users v/s Scripts Prepared and Executed Report, Modules Count Report, QC Script Step Reconciliation Report, Last 10 Days Status Report, and User Skills Assigned Report. Finance reports may include Uncertain Tax Position (UTP) Monthly Billing Summary, UTP Daily, and UTP Integrity Check. These reports may include data across multiple projects, domains and entities. Examples of each type of report are described in FIG. 8. In one embodiment, a user may access the TETL system 100 or data management and analysis application 106 via an Internet portal to set report parameters.

Figure 9:
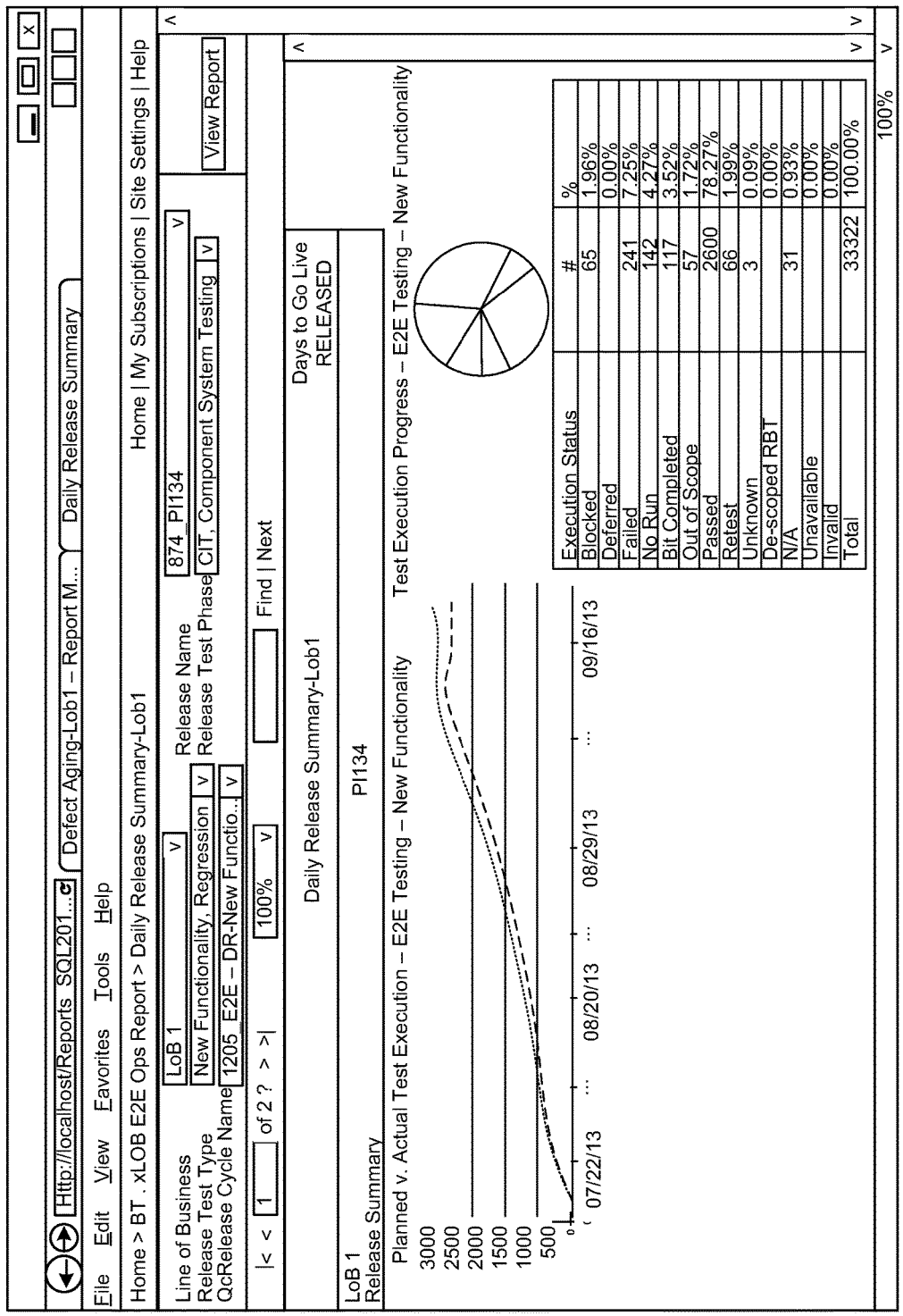
FIGS. 9-12 illustrate examples of screen shots with reports, according to an embodiment.
Figure 10:
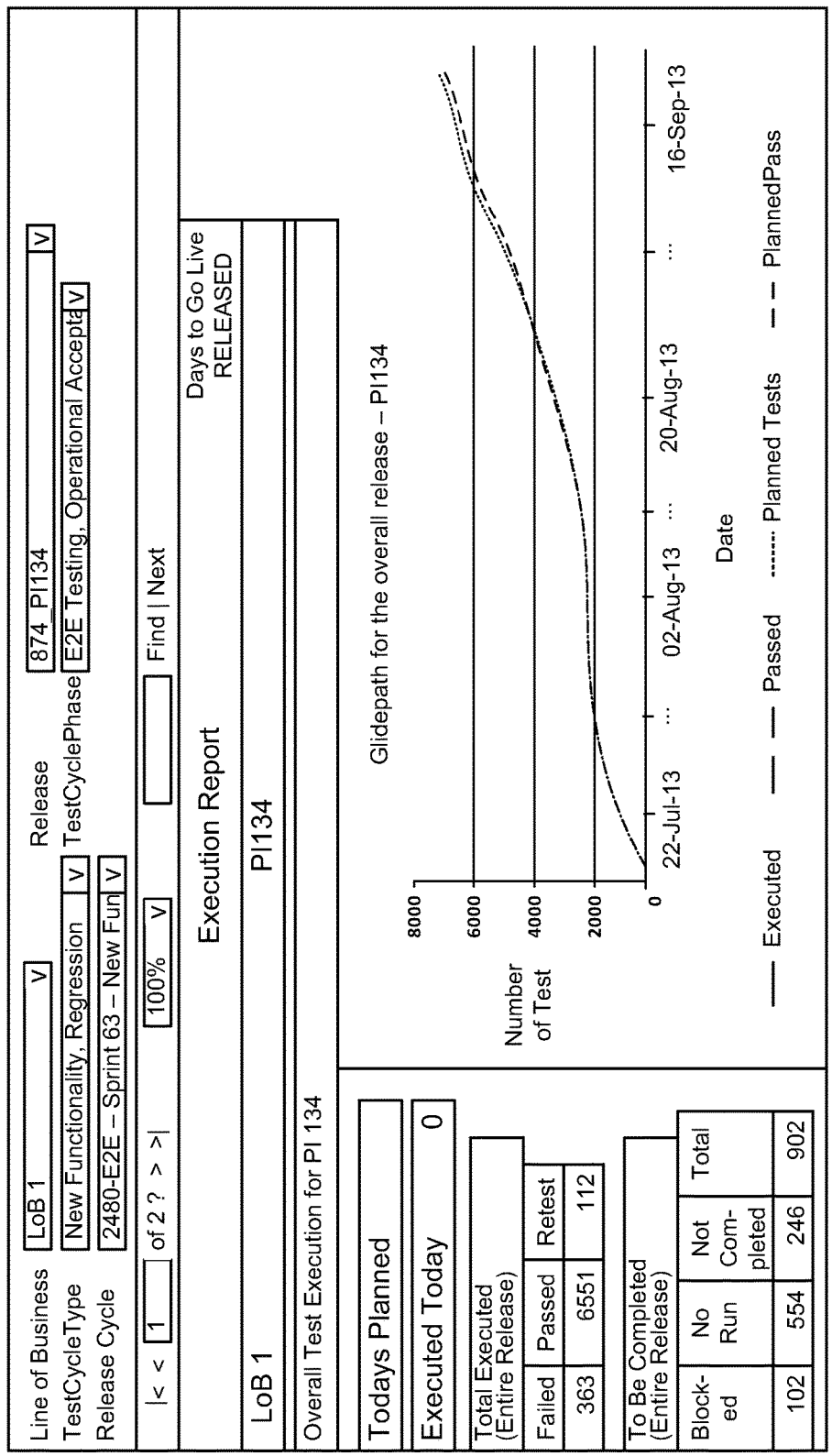
Figure 11:
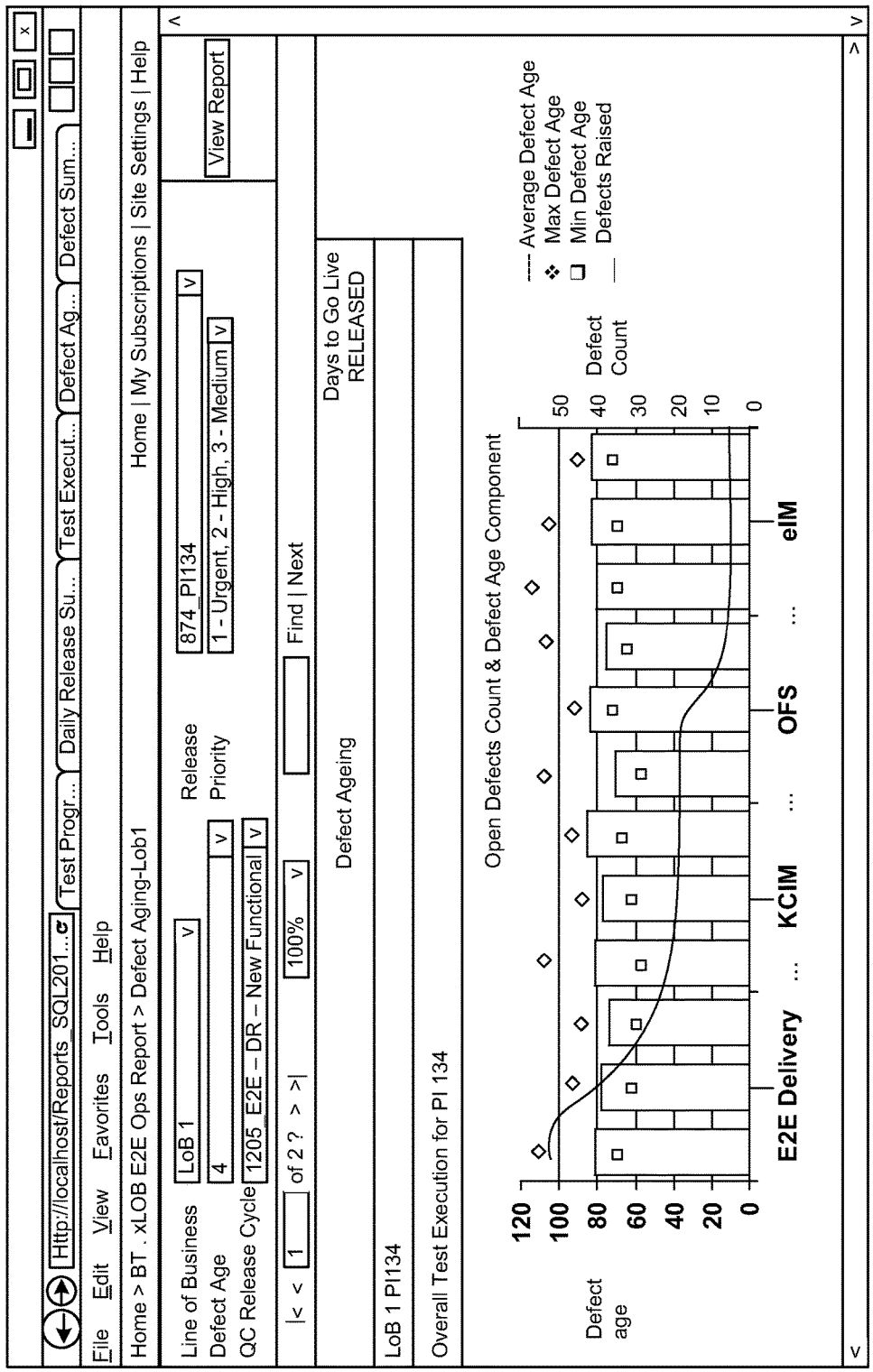
Figure 12:
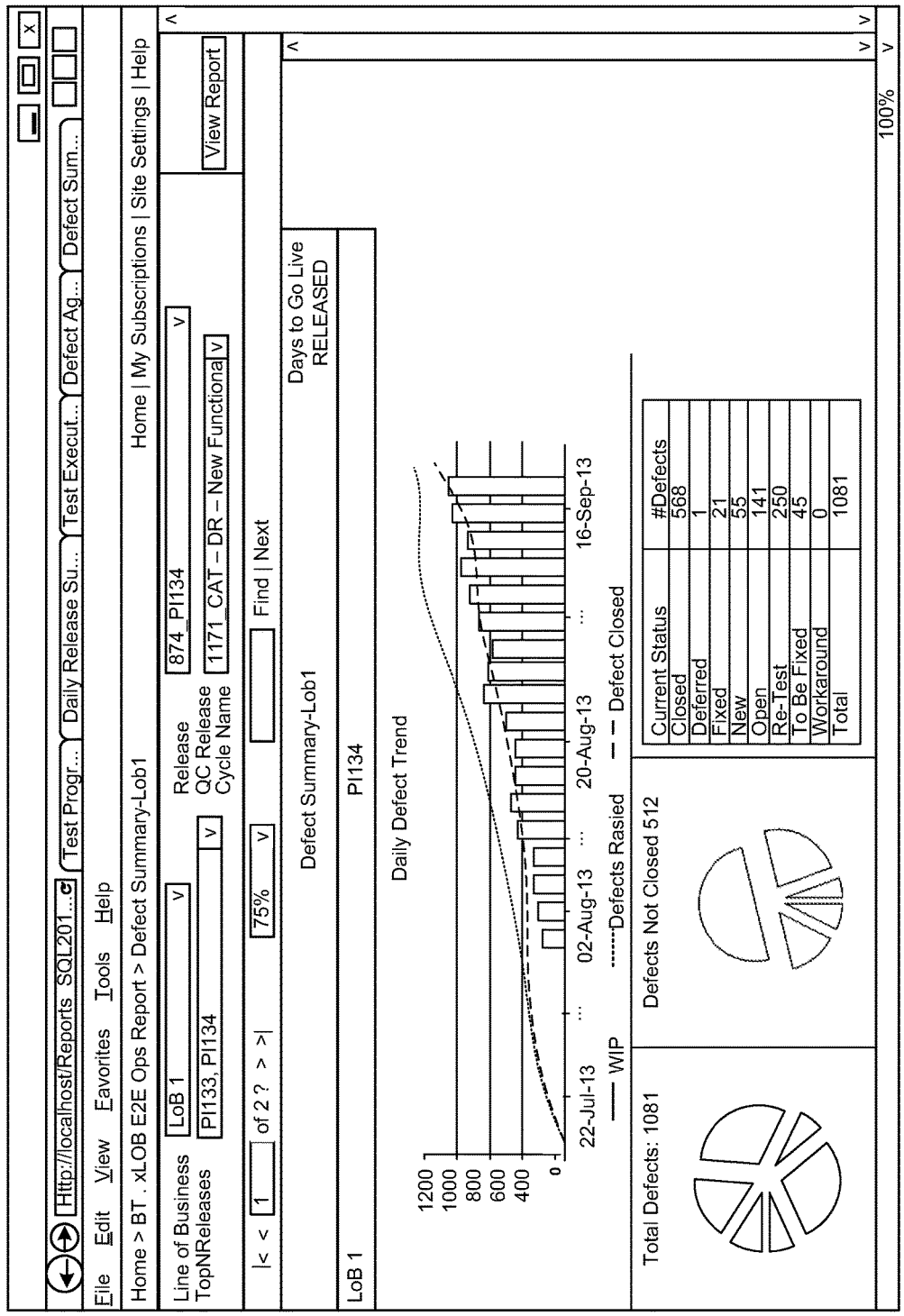

FIG. 9 shows an example of a daily release summary report for a particular line of business, a particular release test type, a particular cycle and a particular test phase. These parameters may be selected by a user. Test data for all projects that fall under the selected parameters may be included in this report, such as number of tests executed over a test period, failure rates, execution status, etc. FIG. 10 shows an example of an execution report for the same selected parameters as the report of FIG. 9. The execution report may show number of tests executed, number of tests to be completed, etc. FIG. 11 shows an example of a defect ageing report. Defects are shown across the domain for LoB 1. For example, the bar chart shows the average age of a defect that is not fixed for particular products or component phase. Defect age is also shown. FIG. 12 shows an example of a defect summary report. A number of defects over a time period for an entire domain are shown. A defect trend, total defects and number of unfixed defects are shown.

FIGS. 9-12 illustrate some examples of reports that may be generated. Any of the domains or entities may be selected and project test data for the selected domains and/or entities may be compiled and shown according to the dimensions selected by the user.

While the embodiments have been described with reference to examples, those skilled in the art will be able to make various modifications to the described embodiments without departing from the scope of the claimed embodiments.

What is claimed is:

1. A testing and extract, transform and load (TETL) system for managing test data generated by test platforms operable to test hardware or software components of information technology systems, the TETL system comprising:
   a communications server including a network interface to receive system under test (SUT) test data instances for each SUT tested by the test platforms;
   a database server including at least one storage device to store the SUT test data instances in intermediate tables, wherein the test data instances are for a plurality of projects in a plurality of domains, and the domains include a plurality of entities;
   an analytics server including at least one hardware processor to:
      determine project schemas for SUTs tested by the test platforms;
      determine fields from each project schema common to all the project schemas;
      create a common view of the test data instances from the fields determined to be common to all project schemas;
      determine fields from each project schema that are not common to all the project schemas;
      create a custom view of the test data instances from fields determined not to be common to all the project schemas;
      create a master view with all the fields from the common view and the fields from the custom view;
      execute a data management and analysis application to determine a cube specification and generate a cube based thereon and further generate multiple types of reports based on the cube, wherein the cube includes dimensions, hierarchies and categories incorporating each of the elements of the individual project schemas and the common and custom views to specify different operations to retrieve a subset of a multi-dimensional array; and
   a common database that includes the test data instances, the project schemas, the common view, the custom view, and the master view, wherein each of the project schemas describe a relationship of the test data for a particular project in terms of the common database,
   wherein the database server loads data from the intermediate tables for the master view into target tables in a data warehouse, wherein the target tables include fields corresponding to the master view and comprising fields identifying projects, domains and entities, and fields for measured test data determined by the test platforms.

2. The TETL system of claim 1, wherein to load the data from the intermediate tables for the master view into the target tables, the database server is determine, for each project schema, whether a field from the master view is included in the project schema, if the field is not included in the project schema, load null-values for the field into at least one of the target tables, and if the field is included in the project schema, load values from at least one of the intermediate tables for the field into the at least one target table.

3. The TETL system of claim 1, wherein prior to loading the data into the target tables, the database server communicates a structure of the master view, including all fields in the master view, to a database server of the data warehouse, and the database server of the data warehouse configures the target tables according to the structure of the master view.

4. The TETL system of claim 1, wherein the data management and analysis application is to generate a view and a report of the view across at least one of the projects, domains and entities.

5. The TETL system of claim 4, wherein the domains include dates, defects, requirements, release and release cycle management, test executions, test plan, and test lab data.

6. The TETL system of claim 4, wherein the domains include a test lab domain, and the entities include entities of the test lab domain comprising a user, a test name, a date of execution of the test, an execution status, a release cycle ID, and a requirement name.

7. The TETL system of claim 4, wherein the data management and analysis application is to generate operational reports, key performance indicator reports, and finance reports across multiple ones of the domains and entities.

8. A testing and extract, transform and load (TETL) system for managing test data generated by test platforms operable to test hardware or software components of information technology systems, the TETL system comprising:
   a data storage device storing intermediate tables;

a network interface connecting the TETL system to a plurality of test platform data sources for the test platforms; and at least one processor to:

determine project schemas for system under tests (SUTs) tested by the test platforms;

receive SUT test data instances for each SUT tested by the test platforms via the network interface;

store the SUT test data instances according to a corresponding project schema in the intermediate tables;

identify all fields from the project schemas;

determine, from all the fields from the project schemas, the fields that are common to all the project schemas;

create a common view of the test data instances from fields determined to be common to all the project schemas;

determine, from all the fields from the project schemas and based on the fields determined to be common to all the project schemas, the fields that are not common to all the project schemas;

create a custom view of the test data instances from fields determined not to be common to all the project schemas;

create a master view with all the fields from the common view and the fields from the custom view;

load data from the intermediate tables for the master view into target tables in a data warehouse, wherein the target tables include fields corresponding to the master view and comprising fields identifying projects, domains and entities, and fields for measured test data determined by the test platforms, wherein the at least one processor determines a cube specification and generates a cube based thereon and further generate multiple types of reports based on the cube, wherein the cube includes dimensions, hierarchies and categories incorporating each of the elements of the individual project schemas and the common and custom views to specify different operations to retrieve a subset of a multi-dimensional array; and a common database that includes the test data instances, the project schemas, the common view, the custom view, and the master view, wherein each of the project schemas describe a relationship of the test data for a particular project in terms of the common database.

9. The TETL system of claim 8, wherein to load the data from the intermediate tables for the master view into the target tables, the at least one processor is to:

determine, for each project schema, whether a field from the master view is included in the project schema;

if the field is not included in the project schema, the at least one processor loads null-values for the field into at least one of the target tables; and if the field is included in the project schema, the at least one processor loads values from at least one of the intermediate tables for the field into the at least one target table.

10. The TETL system of claim 8, wherein the custom view comprises at least one field including values calculated from other fields in the project schemas, and the master view includes all fields from the custom view.

11. The TETL system of claim 8, wherein prior to loading the data into the target tables, the at least one processor is to:

determine a structure of the master view;

generate a master database schema from the master view; and send the master database schema to a database server of the data warehouse, wherein the database server of the data warehouse configures the target tables according to the structure of the master view.

12. The TETL system of claim 11, wherein the master database schema defines tables, fields, and field relationships for configuring the target tables in the master database.

13. The TETL system of claim 8, wherein the at least one processor is to generate a view and a report of the view across at least one of the projects, domains and entities.

14. The TETL system of claim 13, wherein the domains include dates, defects, requirements, release and release cycle management, test executions, test plan, and test lab data.

15. The TETL system of claim 13, wherein the domains include a test lab domain, and the entities include entities of the test lab domain comprising a user, a test name, a date of execution of the test, an execution status, a release cycle ID, and a requirement name.

16. The TETL system of claim 13, wherein the at least one processor is to generate operational reports, key performance indicator reports, and finance reports across multiple domains and entities.

17. A method comprising:

interfacing with at least one test platform via a communications interface to receive test data on each of the plurality of projects from the at least one test platform via the communications interface;

storing the test data in intermediate tables in a data storage device;

determining, by at least one processor, a project schema for each of the plurality of projects based on the test data;

identifying, by the at least one processor, all fields from the project schemas;

determining, by the at least one processor, fields that are common to all the project schemas from all the fields from the project schemas;

creating, by the at least one processor, a common view of the test data instances from the fields determined to be common to all project schemas;

determining, by the at least one processor, fields that are not common to all the project schemas from all the fields from the project schemas and based on the fields determined to be common to all the project schemas;

creating, by the at least one processor, a custom view of the test data instances from the fields determined not to be common to all the project schemas;

creating, by the at least one processor, a master view with all the fields from the common view and the fields from the custom view;

loading data from the intermediate tables for the master view into target tables in a data warehouse, wherein the target tables include fields corresponding to the master view and comprising fields identifying projects, domains and entities, and fields for measured test data determined by the test platforms, wherein the at least one processor determines a cube specification and generates a cube based thereon and further generate multiple types of reports based on the cube, wherein the cube includes dimensions, hierarchies and categories incorporating each of the elements of the individual project schemas and the common and custom views to specify different operations to retrieve a subset of a multi-dimensional array; and storing in a common database test data instances, project schemas, and the common view, the custom view, and the master view, wherein each of the project schemas describes a relationship of the test data for a particular project in terms of the common database.

18. The method of claim 17, comprising:

determining a structure of the master view;

generating a master database schema from the master view; and sending the master database schema to a database server of the data warehouse, wherein the database server of the data warehouse configures the target tables according to the structure of the master view.

\* \* \* \* \*

UNITED STATES PATENT AND TRADEMARK OFFICE
CERTIFICATE OF CORRECTION

PATENT NO. : 10,013,336 B2  
APPLICATION NO. : 14/807638  
DATED : July 3, 2018  
INVENTOR(S) : Yashpal Shah Page 1 of 1

It is certified that error appears in the above-identified patent and that said Letters Patent is hereby corrected as shown below:

On the Title Page

Add Item (30), Foreign Application Priority Data "Aug. 1, 2014 (IN) 3770/CHE/2014".

Signed and Sealed this  
Twenty-eighth Day of August, 2018

Andrei Iancu  
*Director of the United States Patent and Trademark Office*